(12) United States Patent
Frutschi

(10) Patent No.: US 6,845,738 B2
(45) Date of Patent: Jan. 25, 2005

(54) METHOD FOR OPERATING AN INTERNAL COMBUSTION ENGINE

(75) Inventor: Hans Ulrich Frutschi, Riniken (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/739,293

(22) Filed: Dec. 19, 2003

(65) Prior Publication Data

US 2004/0182330 A1 Sep. 23, 2004

Related U.S. Application Data

(63) Continuation of application No. PCT/IB02/01766, filed on May 21, 2002.

(30) Foreign Application Priority Data

Jun. 21, 2001 (CH) .............................................. 1131/01

(51) Int. Cl.$^7$ .............................................. F02M 25/22
(52) U.S. Cl. ..................................... 123/25 C; 123/250
(58) Field of Search ............................. 123/250, 540, 123/542, 568.11, 568.12, 25 C

(56) References Cited

U.S. PATENT DOCUMENTS

| | | | |
|---|---|---|---|
| 4,279,223 A | | 7/1981 | Csonka et al. ............... 123/25 N |
| 4,412,512 A | * | 11/1983 | Cottell ....................... 123/25 E |
| 4,440,116 A | | 4/1984 | Stevenson et al. .......... 123/25 J |
| 4,503,813 A | | 3/1985 | Lindberg .................... 123/25 E |
| 4,664,094 A | | 5/1987 | Royer ......................... 123/494 |
| 4,785,622 A | | 11/1988 | Plumley et al. ............. 60/39.12 |
| 5,271,215 A | | 12/1993 | Guillet ........................ 60/37.5 |
| 5,454,220 A | | 10/1995 | Althaus et al. .............. 60/39.04 |
| 5,535,708 A | * | 7/1996 | Valentine ................... 123/25 C |
| 5,542,379 A | * | 8/1996 | Kessler ....................... 123/25 C |
| 5,577,378 A | | 11/1996 | Althaus et al. .............. 60/39.17 |
| 5,689,948 A | | 11/1997 | Frutschi ..................... 60/39.05 |
| 5,718,194 A | * | 2/1998 | Binion ........................ 123/25 C |
| 5,843,214 A | | 12/1998 | Janes .......................... 60/39.05 |
| 6,095,100 A | * | 8/2000 | Hughes ....................... 123/25 C |
| 6,161,385 A | | 12/2000 | Rebhan ....................... 60/646 |
| 6,286,482 B1 | * | 9/2001 | Flynn et al. ................. 123/435 |

FOREIGN PATENT DOCUMENTS

| | | |
|---|---|---|
| DE | 31 42 851 A1 | 6/1983 |
| DE | 40 35 064 C1 | 10/1991 |
| DE | 199 18 591 A1 | 10/2000 |
| DE | 199 36 704 A1 | 2/2001 |
| EP | 0 620 362 A1 | 10/1994 |

(List continued on next page.)

Primary Examiner—Henry C. Yuen
Assistant Examiner—Jason Benton
(74) Attorney, Agent, or Firm—Collier Shannon Scott, PLLC

(57) ABSTRACT

In a turbocharged diesel engine, the charge air is cooled in a charge air cooler designed as an injection intercooler. The water which has been introduced into the working medium of the diesel engine in the charge air cooler, after the working medium has been expanded, is condensed out of the exhaust gas by means of a condenser and a separator and is returned to the charge air cooler. According to the invention, the engine is started without injection of externally supplied water into the charge air cooler. Water which forms during the combustion in the diesel engine is condensed out of the exhaust-gas stream and returned to the charge air cooler. Additional water vapor formed continuously during operation through combustion of diesel fuel is likewise condensed out and introduced into the charge air cooler. In this way, the working medium is laden with moisture until the water mass flow that can be separated out of the exhaust gas is sufficient for the set cooling power of the charge air cooler. Further combustion water that is formed can be used for other purposes. In this way, engines with internal combustion in which water is introduced into the working medium can be operated without an external supply of water.

17 Claims, 2 Drawing Sheets

FOREIGN PATENT DOCUMENTS

| | | |
|---|---|---|
| EP | 0 985 891 | 3/2000 |
| GB | 2 236 145 A | 3/1991 |
| GB | 2 259 326 A | 3/1993 |
| JP | 56-83516 | 7/1981 |
| JP | 61-76747 | 4/1986 |
| JP | 03-61658 | 3/1991 |
| JP | 04-298674 | 10/1992 |
| JP | 2000-282894 | 10/2000 |
| JP | 2001-55907 | 2/2001 |

* cited by examiner

US 6,845,738 B2

METHOD FOR OPERATING AN INTERNAL COMBUSTION ENGINE

CROSS-REFERENCE TO RELATED APPLICATIONS

This application is a continuation of the U.S. National Stage designation of co-pending International Patent Application PCT/IB02/01766, filed May 21, 2002, the entire content of which is expressly incorporated herein by reference thereto.

FIELD OF THE INVENTION

The invention relates to a method used to enrich the working medium of an internal combustion engine with moisture.

BACKGROUND OF THE INVENTION

Charge air cooling is in widespread use in supercharged piston engines, in particular large diesel engines with turbocharging. The cooling of the precompressed combustion air increases the density of the intake working medium and therefore the charge in the cylinders. In the case of coolers which are based on heat exchange with ambient air, cooling water or other cooling media, the dissipation of enthalpy from the cycle process has proven to be disadvantageous. It is known from U.S. Pat. No. 4,440,116 or GB 2 259 326 for water or a water-alcohol mixture to be injected into the working medium upstream or downstream, respectively, of the compressor of a turbocharger. The evaporation extracts heat from the intake air and the overall volume of the working medium decreases. The heat which has been extracted remains present in the water vapor which is formed and in this way is not initially lost to the cycle process. Evaporation cooling of this nature can also be used for other purposes, for example described in U.S. Pat. No. 4,664,091. The injection of water for cooling purposes and secondly as an inert medium in the intake section or directly in the combustion chamber of engines with internal combustion allows the formation of nitrogen oxides to be reduced. Therefore, the tendency toward the feared knocking combustion can be reduced in piston engines which are operated with spark ignition, i.e. for example in the case of operation with carburetor fuels or fuel gases. Particularly in the case of very hot and dry ambient conditions, the cooling of the intake air by introduction and evaporation of water may be advantageous even for engines which are not supercharged or other engines with internal combustion, in order to increase the filling of the combustion chambers and to reduce the compression work required. In this context, it may also be of interest for so much water to be introduced into the intake air that drops are still present even during the compression phase. The evaporation of these drops during the compression ensures intensive internal cooling during the compression process and therefore leads to a further reduction in the compression work. The water vapor which is formed, on the other hand, performs useful work during expansion. This overall effect of increasing output was observed as early as the 1940s and 1950s, when preliminary coolers or intercoolers in closed gas turbine cycles were leaky, so that cooling water entered the compressor.

One problem of the methods which have been discussed for conditioning the working medium is the need to continuously provide water which has to satisfy high purity requirements and which is expelled with the exhaust gas in the case of an engine with internal combustion, so that it is lost. For example, in the case of diesel engines or gas turbine sets which are used to drive vehicles, it is then always necessary for a sufficiently large water tank to be transported to cover the demand for water over a certain driving distance or operating time.

Furthermore, in gas turbine plants, there are known methods of recuperating waste heat from the exhaust gas by injecting steam into the working medium. For example, U.S. Pat. No. 5,689,948 has disclosed a power plant in which the waste heat from a gas turbine is used to generate steam. The steam is introduced into the pressurized working medium of the gas turbine set at a suitable location and is expanded in the gas turbine so as to release useful power. With techniques of this nature, it is possible to achieve very good characteristic values with regard to efficiency and output for relatively little outlay. A drawback is the high consumption of water, since the water vapor which is generated is expelled to atmosphere together with the exhaust gas. Especially in arid areas, the quantities of water required cannot be provided in the long term or at least can only be provided at very high economic cost. The abovementioned methods for cooling the intake working medium before or during the compression can also advantageously be used in conjunction with gas turbine sets.

Furthermore, it is also known to introduce water or steam into the combustion chamber of a gas turbine set in order to reduce the levels of nitrogen oxide emissions.

It is also known to use steam to cool the highly thermally loaded components of a gas turbine set and to allow this steam to flow out into the working medium after cooling has taken place.

In each of the methods mentioned, however, a water mass flow is fed to the working medium of an engine with internal combustion—irrespective of whether this be the intake air, the partially compressed or compressed combustion air or the hot gas—and according to the prior art this water mass flow is expelled to atmosphere together with the exhaust gas, in other words the expanded working medium. Consequently, high-quality water in quantities of quite easily several tonnes per hour have to be provided for methods of this nature. However, this is often very difficult or impossible to realize for political, economic or even moral ethics and social reasons, and consequently it is often impossible to use technically viable and desirable solutions.

Therefore, in U.S. Pat. No. 5,843,214 it is proposed for water which has been introduced into the working medium of an engine with internal combustion—for example in an STIG gas turbine—to be condensed in the exhaust gas after the working medium has been expanded and then returned to the working medium. However, autonomous operation is of course only possible if the moisture contained in the exhaust gas is sufficient for an exhaust-gas condenser to produce a water mass flow which at least corresponds to the water or steam mass flow required to be introduced into the working medium. Therefore, it is necessary for the working medium to be enriched with moisture before autonomous operation can be achieved.

SUMMARY OF THE INVENTION

Accordingly, the invention relates to providing a novel method for operating an engine with internal combustion in which external supply of water can be completely eliminated for enriching the working medium of the engine with moisture.

According to the invention, the method for enriching the working medium of an engine with internal combustion with moisture comprises the following steps: starting the circulation process of the engine; combustion of hydrocarbon-containing and/or hydrogen-containing fuels; separating a first combustion water mass flow, which results from the combustion of the hydrocarbon-containing and/or hydrogen-containing fuel, from the exhaust gas from the engine; introducing the water mass flow which has been separated out into the working medium of the engine at a suitable location; at least partial separation of the combustion water mass flow which has been introduced and an additional combustion water mass flow from the exhaust gas; at least partial recirculation of the combustion water mass flow which has been introduced and the additional combustion water mass flow into the working medium of the engine.

Therefore, the core of the invention consists in the fact that the entire quantity of water which is introduced into the working medium of the engine results from the combustion itself, and/or a small proportion has been—not deliberately—sucked in with the ambient air in the case of an air-aspirating engine. During the starting operation, a first combustion water mass flow, formed by the oxidation of hydrocarbon-containing or hydrogen-containing fuels, is separated out of the working medium following the expansion, i.e. out of the exhaust gas of the engine, and is recirculated to the working medium of the engine. Therefore, this recirculated combustion water mass flow is returned to the exhaust gas; in addition, the combustion of further fuel produces additional combustion water, such that the partial pressure of the water vapor in the exhaust gas and therefore the quantity of water which can be separated out increases. In this way, the recirculation of the combustion water, on the one hand, and the generation of additional combustion water, on the other hand, cause the working medium of the engine to be enriched to an ever greater extent with moisture. Therefore, according to the invention the working medium of the cycle process is laden with moisture without needing an external supply of water. When an engine with internal combustion is operating in accordance with the method of the invention, there is no need for any infrastructure for supplying water. Since the entire amount of water originates from a condensation process, the water which is separated out also already satisfies high purity requirements, and consequently the provision of water is in principle—at least when sulfur-free fuels which are also not contaminated in any other way are being used, and in particular when natural gas is being burnt—not very complex.

Overall, natural gas is in any case a very suitable fuel for carrying out the method according to the invention. The high methane content of this fuel means that the partial pressure of the water vapor in the pure combustion product is high, with the result that the working medium can rapidly be laden with moisture, but it is of course also possible for the method to be carried out when using relatively high-molecular hydrocarbons, such as especially diesel oil, although the less favorable HIC ratio means that the loading rate is lower, such that it takes a correspondingly longer time to reach the final steady state.

Of course, the maximum water mass flow introduced into the working medium is limited; consequently, an engine which is operated in accordance with the invention ultimately produces an excess of water. This can be used, inter alia, to fill a combustion water reservoir, which can be temporarily used during a further starting operation to provide water to be introduced into the working medium, so that the latter is enriched with moisture more quickly. Nevertheless, in this case too the method operates completely autonomously, since even the water which is subject to intermediate storage in the reservoir results completely—apart from a small proportion which originates from the atmospheric humidity of the ambient air in the case of an air-aspirating engine—from the combustion inside the engine.

In steady-state operation, a situation results in which the gas turbine process generates an excess of water, which in particular in regions where water is scarce can be used for numerous applications, for example to obtain service water or drinking water or to irrigate agricultural areas.

With regard to the appropriate location for introducing the water mass flow into the working medium, it should be noted that this location should be determined on a case-by-case basis. For example, the water mass flow can be used to cool an air mass flow sucked in from the environment, the water mass flow can be introduced into the working medium following compression or even during compression, and also during or after the supply of heat to the working medium, or also during the expansion operation. The person skilled in the art will readily be able to determine a suitable location on the basis of his general specialist knowledge. Consequently, the term working medium as used in the present document is to be understood in a broad sense; it also comprises in particular medium which is located in the intake section or in the incoming flow of an engine, as well as the expanded working medium flowing out after expansion, releasing useful work as it does so, which in the case of an engine with internal combustion can substantially be equated to an exhaust gas. Moreover, the water mass flow may be introduced into the working medium in liquid form or as saturated steam or superheated steam without affecting the essence of the invention.

In a first embodiment of the method according to the invention, the water mass flow is at least partially used for charge air cooling of a supercharged displacement machine, for example in an injection or evaporation cooler which is arranged downstream of the air compressor of a turbocharged diesel engine.

In a second embodiment, the water mass flow is at least partially introduced into a combustion chamber of the engine in order to reduce the levels of nitrogen oxides.

In a further embodiment, the water mass flow is at least partially introduced into the intake section of the engine; in this case, the intake working medium may also be supersaturated, so that favorable internal cooling is achieved during compression through evaporation.

A further particularly expedient embodiment of the method according to the invention is its use in the realization of what is known as an STIG (STeam Injection Gas turbine) process which is known per se, in which case the water mass flow is introduced into a pressurized working medium of the gas turbine set after evaporation and preferably superheating. In general, when the water mass flow is introduced into compressed working medium, it may always prove favorable for the water mass flow to be heated before being introduced into the working medium, even if no evaporation is taking place.

A further application involves methods in which water or steam is introduced into the cooling system of a gas turbine set, from where it flows on into the working medium; operating methods of this type are known, for example, from EP 985 891 and the corresponding U.S. Pat. No. 6,161,385, or from GB 2 236 145. The list of applications given here is merely intended to give an indication of the wide range of possible ways of exploiting the inventive idea and makes no claim whatsoever to be exhaustive.

It has already been implied above that the water mass flow to be introduced into the working medium is to be set to a set value. A set value of this type is advantageously predetermined as a function of an output characteristic variable of the engine. In a further preferred method variant, the water mass flow is not set to an absolute value, but rather as a relative value, based on the fuel mass flow. If the water mass flow is used to cool the intake working medium, it can advantageously also be adjusted to a target value for the atmospheric humidity or the temperature.

Furthermore, it will be readily understood that a combination of various forms of introduction of the water mass flow into the working medium is also possible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
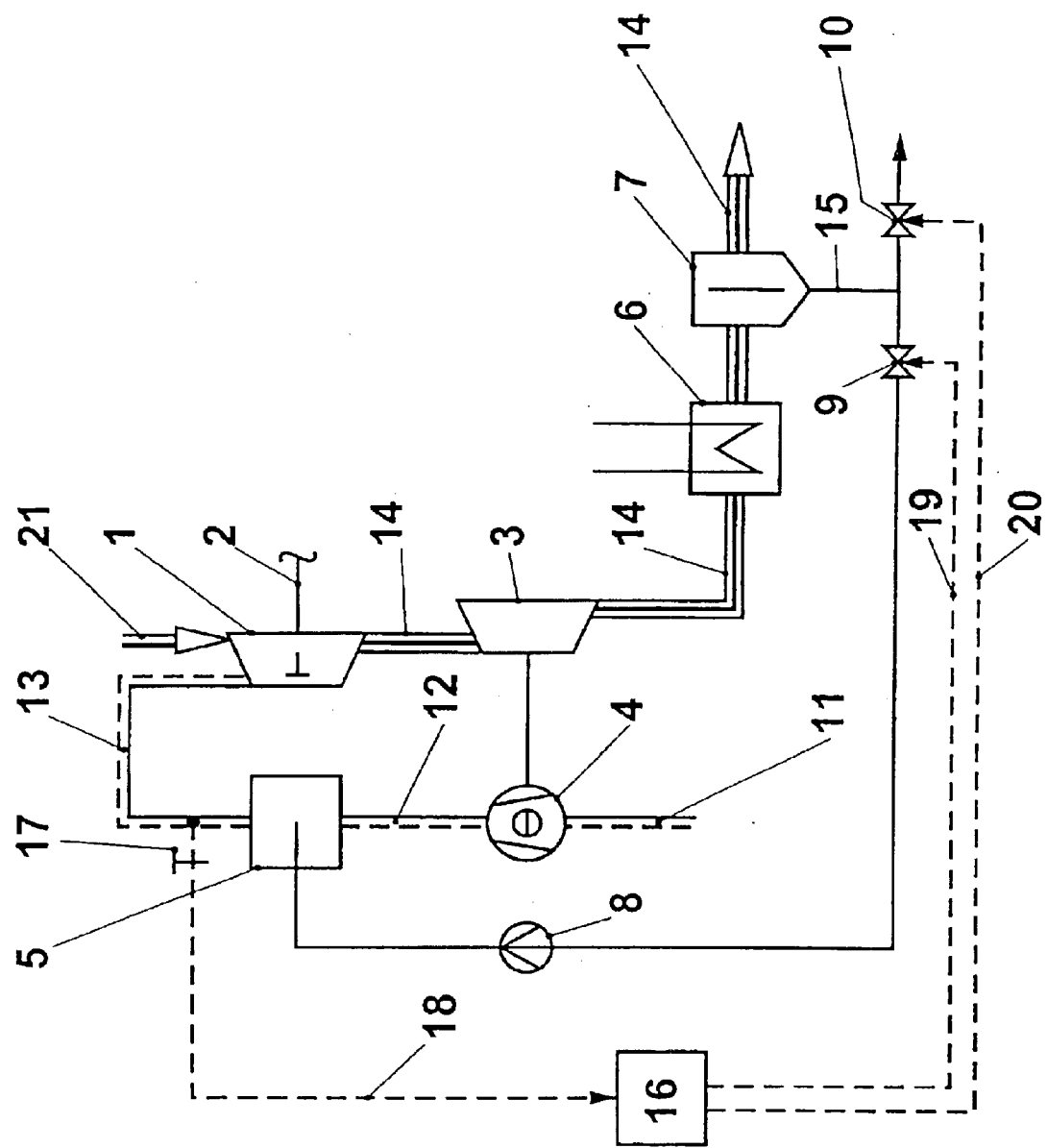
FIG. 1 shows a turbocharged diesel engine which is intended to carry out a method according to the present invention.

Referring now to the drawings, wherein like reference numerals designate identical or corresponding parts throughout the several views, FIG. 1 shows a diesel engine 1 that is provided with turbocharging and drives a generator, a vehicle or some other power consumer via an output shaft 2. Exhaust gas 14 from the diesel engine flows into the turbine 3 of an exhaust-gas turbocharger. The turbine 3 drives a radial compressor 4. This radial compressor precompresses an intake air stream 11, in such a manner that the cylinders of the diesel engine are filled with a greater quantity of combustion air for a given displacement. During the precompression, the intake air stream is heated, which in turn has adverse effects on the cylinder charging. Therefore, a charge air cooler 5 is provided between the compressor 4 of the exhaust-gas turbocharger and the engine 1. Charge air 12 flows into the charge air cooler 5, where it is cooled, and the engine sucks in cooled charge air 13 with a correspondingly higher air density. The displacement of the engine is therefore filled with a correspondingly large mass of air, which means that more fuel is burnt and therefore a higher output is achieved.

The charge air cooler is in this case designed as an evaporation cooler, i.e. water is injected and then evaporates, leading to cooling of the charge air without heat being extracted from the cycle process. In this case, it is in principle also possible for the charge air to be excessively humidified, in such a manner that droplets of liquid pass into the cylinders of the diesel engine 1, leading to internal cooling during the compression stroke and therefore to a reduction in the compression work required. An exhaust-gas condenser 6 and a water separator 7 are arranged in the exhaust section downstream of the turbocharger turbine 3. Moisture contained in the exhaust gas 14 is condensed out in the condenser 6 and separated out as water mass flow 15 in the separator 7. A pump 8 delivers at least some of this water mass flow into the charge air cooler 5, from where it is in turn introduced into the working medium.

Although recirculation of the water mass flow introduced into the charge air cooler allows the charge air cooling to be operated autonomously, without external supply of water, in steady-state operation, in the event of a fluctuating load or very particularly when starting up, there is a demand for the working medium to be enriched with moisture, so that a sufficient mass flow of water can be separated out of the exhaust gas for the charge air cooler 5 to produce its set cooling capacity.

The charging pressure of the turbocharger compressor, and therefore the temperature of the charge air 12, varies at different engine outputs, i.e. the quantity of water which is to be introduced into the charge air cooler to achieve a set operating state, for example a set temperature of the cooled charge air 13, fluctuates. When the engine output and therefore the charge pressure are reduced, some of the water contained in the working medium has to be discarded via an overflow valve 10 if excessive humidity of the charge air is to be avoided. On the other hand, if the charge pressure rises with the engine output, additional water has to be provided in order to achieve the required cooling capacity. This demand arises in particular in the case of vehicle drives, since on the one hand they have to deal with relatively frequent load changes, and on the other hand they also have to be able to start up anywhere without carrying an almost unlimited stock of water around with them.

According to the invention, therefore, the enriching of the working medium with moisture is carried out exclusively using water that is produced by the combustion of hydrocarbons or of hydrogen-containing fuels 21 in the engine. When the diesel engine is being started up, the exhaust-gas turbocharger is in any case not in operation, and in a starting phase it also supplies only a very low charging pressure. Therefore, the engine 1 is started without charge air cooling. In the case of the combustion of diesel oil 21, which substantially comprises hydrocarbons, a first combustion water quantity is formed, which is separated out in the separator 7 and passed into the charge air cooler 5. This first combustion water mass flow which has been separated out therefore in turn passes together with the working medium into the exhaust gas 14, where it is separated out and recirculated into the charge air cooler. At the same time, further moisture is formed as combustion continues, and this moisture is likewise separated out and introduced into the charge air cooler. In this way, the water mass flow which is available rises continuously and the working medium is enriched with moisture. For as long as it remains impossible to obtain the complete quantity of water from the exhaust gas, the charge air cooler operates with a reduced capacity, with the result that the maximum engine output available is also reduced; nevertheless, the engine is fully functional. The only restriction to be mentioned is that it is only possible to react to fluctuating load demands, which are associated with a changing charging pressure and therefore a changing charge air temperature, after a certain time delay.

In this context, however, it is possible to provide a combustion water reservoir (not shown), that is responsible for intermediate storage of excess water formed by combustion in steady-state operation and in the event of transient demands temporarily makes this water available. A reservoir of this type may be of relatively small design, since in each instance it is only necessary for some of the water quantity required to be temporarily made available by this means, whereas otherwise the reservoir continues to be loaded autonomously. In any event, however, water formed by the combustion in the engine—and to a small amount moisture sucked in with the ambient air—is exclusively used for introduction into the working medium, such that the process takes place completely independently of an external supply of water or a stock of water which is carried around.

The water mass flow introduced into the charge air cooler is adjusted as a function of the temperature of the cooled charge air 13, in such a manner that the quantity of water injected is sufficient for the charge air cooler to produce its set cooling capacity, which ultimately indirectly defines a set mass flow. A temperature-measuring location 17 records the temperature of the charge air downstream of the charge air cooler 5. A temperature signal 18 is supplied to a control unit 16, which acts on two operating members 9 and 10 via control lines 19, 20.

In a first operating state, the first operating member 9 is completely open and the operating member 10 is completely closed. The entire water mass flow 15 which has been separated out is passed into the cooler 5 via the pump 8. If the temperature measured at the measuring location 17 drops below a lower limit value, the supply of water through the operating member 9 is restricted. At the same time, the operating member 10 is opened, in order for excess water which is separated out to be discarded or fed for a different use. In this way, the water mass flow fed to the working medium is set in such a manner that a target value for the temperature of the cooled charge air 13 is maintained as accurately as possible. It would also be possible for the humidity of the cooled charge air 13 to be measured and adjusted instead of the temperature, or alternatively this parameter could be recorded as an additional variable.

Figure 2:
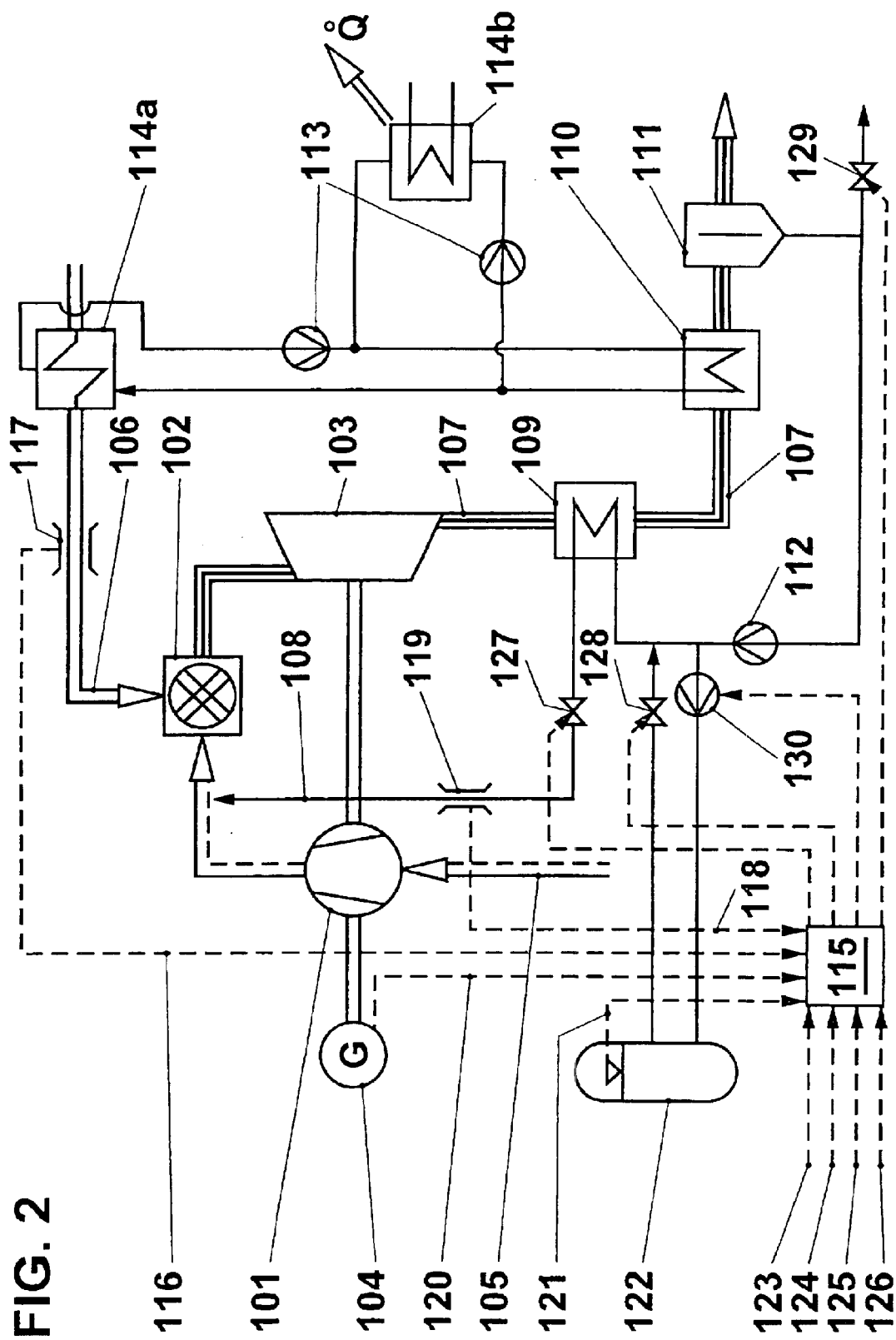
FIG. 2 shows a power plant having a gas turbine set which is intended to carry out a method according to the present invention.

FIG. 2 diagrammatically depicts a power plant that comprises a gas turbine set for carrying out a variant of the method according to the invention. A compressor 101 sucks up an air mass flow 105 as working medium and compresses it. A quantity of fuel 106 is burnt in the compressed combustion air in a combustion chamber 102. Pressurized hot gas that is formed is expanded in a turbine 103, releasing a mechanical shaft power. This power is used to drive the compressor 101 and a generator 104. Expanded working medium 107, which in the case of an engine with internal combustion is in reality a flue gas, flows out of the turbine. This expanded working medium still has a high calorific potential. The gas turbine set illustrated is designed to make optimum use of this calorific potential at a low level of outlay without entailing the outlay required for a complete combined-cycle power plant. For this purpose, a pressurized water or steam mass flow 108 is fed to the pressurized working medium, having previously flowed through an exhaust-gas heat exchanger 109, so that it returned waste heat from the expanded working medium to the thermodynamic cycle process; if large quantities of steam are supplied, it is possible to speak of what is known as an STIG process. This on the one hand increases the mass flow passed through the turbine and thereby has a direct influence on the output. Furthermore, the increase in mass flow also has an influence on the pressure ratio of the process, with the result that the pressure of the pressurized working medium in the combustion chamber 102 rises, which in turn increases the efficiency of the process.

The water or steam is introduced either downstream of the combustion chamber 102, at the entry to the turbine or in the turbine itself, or, as in the example illustrated, upstream of the combustion chamber 102 or into the combustion chamber; combinations are also possible. The first variant of the method has the advantage that the water or steam cannot have any adverse effects on the combustion. Although this fundamentally negative effect comes to bear during the introduction into the combustion chamber or upstream of the combustion chamber, it can quite easily produce desirable effects: firstly, the injection of inert media into the reaction zone of a combustion chamber is often employed as an effective way of reducing the formation of nitrogen oxides. In addition, the greater mass flow in the combustion chamber in this method variant makes it possible to burn more fuel for a given upper limit for the hot-gas temperature, leading to a further increase in output. Furthermore, for efficiency it is favorable for the water or steam mass flow to be introduced at a location where the process pressure is as high as possible; in the case of a gas turbine set with sequential combustion, as is known, for example, from EP 620 362 and the corresponding U.S. Pat. No. 5,454,220 and U.S. Pat. No. 5,577,378, the entire contents of which are expressly incorporated herein by reference thereto, this means that the water or steam is preferably introduced in the region of the first combustion chamber. Overall, with regard to the output and in general terms also with regard to the efficiency, it is expedient for the water or steam to be introduced in such a way that this mass flow participates in at least part of the expansion via the turbine.

In the present case, the exhaust-gas heat exchanger 109 is illustrated as a preheater. Of course, it is also possible for a steam generator and superheater to be arranged at this location, which contributes to a further increase in efficiency but on the other hand also increases the outlay on equipment which has to be incurred. It is known from the prior art for the water introduced into the working medium to be recovered from the exhaust gas. For this purpose, a flue-gas condenser 110, which cools the expanded working medium to below the boiling point of the water that it contains, is arranged in the flow path of the expanded working medium. Consequently, the water that has been introduced into the working medium or the steam which has been introduced into the working medium is condensed out and is separated out downstream in a condensate separator 111. A pump 112 brings this condensate to a pressure which is in any event higher than the pressure of the working medium at the location of introduction, in the present case higher than the combustion chamber pressure.

The water is heated in the preheater 109 as described; it is also readily possible for an evaporator and a superheater to be arranged at the location of the preheater 109. The water mass flow 108 is introduced into the pressurized working medium as heated pressurized water upstream of combustion chamber 102; as has been mentioned, it is also possible for it to be introduced into the pressurized working medium at other suitable locations. The possibility of evaporating the pressurized water and superheating the stream produced in this way before it is introduced into the pressurized working medium has also been mentioned above. This procedure results in a large proportion of the heat contained in the expanded working medium 107 being returned to the working process so that it can be utilized. In the exemplary embodiment illustrated, the heat of condensation of the water vapor, which is produced at a low temperature level, is also utilized.

Cool medium, which leaves the condenser tubing after it has absorbed heat from the expanded working medium at a temperature of, for example, 70° C. or below, is fed to the condenser 110. Circulation pumps 113 deliver some of the heated coolant into a fuel preheater 114a, in which the heat which has been extracted from the exhaust gas in the flue-gas condenser 110 and is at a low exergy is transferred to the fuel and thereby fed back to the thermodynamic cycle process. A further part of the heated coolant is passed through a heat sink 114b, for example a cooling tower, where a quantity of heat Q is dissipated. As has been indicated above, the recovery of water introduced into the working medium, in particular in conjunction with the STIG process, is known from the prior art.

Nevertheless, to enable the required quantity of water to be obtained from the exhaust gas 107, the working medium must first of all be enriched with moisture, as in the first exemplary embodiment. When the method according to the invention is carried out, this is achieved entirely without the need for an external supply of water, exclusively using moisture resulting from combustion, and consequently the power plant illustrated can also make do without a water feed line. The—optional—combustion water reservoir 122 illustrated, the function of which is explained below, is according to the invention likewise only loaded with combustion water which is produced as an excess in steady-state operation.

According to the invention, after the gas turbine set has been started, the working medium is enriched with combustion water formed through the combustion of hydrocarbon-containing or hydrogen-containing fuel 106. The introduction of water or steam into the working process can preferably be monitored by suitable monitoring and control equipment: as the mass flow of additionally introduced medium, such as water or steam, rises, the pressure ratio of the process in the power plant illustrated also increases, and in this context a certain safety margin with respect to the break-off limit of the compressor must of course be ensured. Therefore, the mass flow 108 to be introduced is adjusted to a set value, or an upper limit value is predetermined. This does not usually involve setting an absolute value, but rather a set or limit value which is predetermined relative to the quantity of fuel, as a function of output. The control and/or adjustment is performed by means of a central control unit 115, which receives a wide range of measured values.

A signal is supplied to a fuel-flow measuring location 117 via a signal line 116. The signal from a water or steam mass flow measuring location 119 is supplied via a signal line 118. A signal line 120 provides an output signal from the generator 104. Furthermore, a signal line 121 provides a level signal from a vessel 122. In addition, the control unit 115 receives additional information about operating parameters of the power plant, ambient conditions and the like via a further signal lines 123, 124, 125, 126. With the aid of this information, the control unit 115 is able to form an output characteristic variable, as a function of which the quantity of water or steam 108 to be introduced is to be set. In this case, a table of set values is stored in a memory of the control unit. The actual value is determined from the measured values from the flow measuring locations 117 and 119, and primarily the operating members 127 and 129, and in addition also an operating member 128 and a delivery pump 130, are acted on as a function of the deviation from the set value.

With regard to the method sequence, the following can be stated: when the power plant is being started up, hydrocarbon-containing or hydrogen-containing fuel 106 is fed to the combustion air flowing into the combustion chamber 102. During the combustion of this fuel, a pressurized hot gas is formed, containing, inter alia, water vapor as a combustion product. The pressurized hot gas is expanded in a known way in the turbine 103, so as to release mechanical output. The working medium, which has now been expanded, downstream of the turbine flows through the preheater 109 and the exhaust-gas condenser 110. A first combustion water mass flow is separated from the remaining flue gas in the separator 111. The flue gas flows out into the atmosphere. A pump 112 brings the water which has been separated out, initially with operating member 129 closed, to a pressure which is in any event higher than the pressure in the combustion chamber 102. The pressurized water flows through the secondary side of the preheater 109, which has the expanded working medium 107 flowing through it on the primary side. The water mass flow 8 which has been heated in this way is introduced into the pressurized working medium of the gas turbine set. The first combustion water has thereby been returned to the working medium of the engine again, and after expansion in the turbine 103 is condensed again, separated out and fed back into the working medium.

The combustion produces additional combustion water, which is likewise separated out in the exhaust section and returned to the working medium. In this way, the working medium is enriched with moisture, i.e. the partial pressure of the water vapor in the working medium rises without external supply of water which does not result from the combustion being required. As the increase in the water mass flow continues, on the one hand it should be ensured that the combustion is not adversely affected, and on the other hand the pressure ratio of the working process must not be increased to such an extent that a safety margin with respect to the break-off limit of the compressor is no longer ensured. The monitoring mechanisms implemented in the control unit 115 intervene to prevent this from occurring. The operating state of the gas turbine set is determined from the recorded measured values. The fuel mass flow is determined at a fuel quantity measuring location 117. A maximum permissible value for the water mass flow 108 to be introduced is known as a function of these variables.

The actual value of the water mass flow is determined at a flow measuring location 119 and compared with the set value or limit value. If the actual value which is determined rises above the maximum value, the operating member 127 is restricted. At the same time, it is determined whether the level in the vessel 122 is below a maximum value. If it is, the feed pump 130 starts to operate and combustion water which is separated out above the maximum permissible mass flow in the separator 111 is fed into the combustion water reservoir 122, which is designed as a pressurized store; in this case, the operating member 128 is completely closed. The water that is stored here under pressure can be introduced into the working medium by opening the operating member 128 if the quantity of water produced in the separator 111 is below the maximum or set value for the water mass flow to be introduced. This procedure is also advantageous to ensure that the preheater 109 is not run dry on the secondary side in particular when the plant is starting up: apart from questions of cooling the heat exchange surfaces of the preheater, ensuring that the flow on the secondary side is always sufficient means that the inlet temperature of the expanded working medium when it enters the exhaust-gas condenser 110 is permanently kept at a low level. In this case too, however, it should be noted that the reservoir 122 has previously been loaded with combustion water, such that once again only combustion water which originates from the combustion process is used to enrich the working medium.

When the level in the reservoir 122 has reached a maximum value, the pump 130 is stopped and the operating member 129 is opened, such that excess water produced in the separator 111 can flow out via the operating member 129. This water may on the one hand be discarded; on the other hand, it originates from a condensation process and, if sulfur-free fuels which are also not contaminated with any other toxins—for example heavy metals—are used to operate the gas turbine set, it has a relatively high purity. Particularly in regions where water is scarce, this water can then be supplied for uses which require a high quality, such as irrigation of agricultural areas or even drinking water, without any further treatment or with only a small amount of further treatment; however, the water can also be used as service water, for example for process engineering purposes. On the other hand, if sulfur-containing fuels are being burnt, it is necessary to take the corresponding apparatus precautions; since according to the invention it is inevitable that the temperature will drop below the dew point, it is then also necessary, for example, to use steels which are resistant to corrosion under the action of acids. Overall, the use of sulfur-free fuels is definitively to be preferred when realizing the invention.

The monitoring mechanisms described above function in a completely similar way if the water mass flow is introduced into the working medium of the gas turbine set elsewhere, for example upstream of the compressor or in the compressor. The variables on the basis of which adjustment is carried out, as well as the measured values fed to the control unit, then differ; however, the condensed water mass flows are divided into recirculated water and excess water in a completely similar way, which will be readily comprehensible to the person skilled in the art and does not require any further explanation.

Obviously, numerous modifications and variations of the present invention are possible in light of the above teachings. It is therefore to be understood that within the scope of the appended claims, the invention may be practiced otherwise than as specifically described herein.

What is claimed is:

1. A method for enriching working fluid of an internal combustion engine with moisture, the method comprising the steps of:
    starting a cyclic process of the engine;
    combusting at least one of a hydrocarbon-containing fuel and a hydrogen-containing fuel;
    passing the entire exhaust gas flow through a condenser arranged in the flow path of the entire exhaust gas;
    separating a first combustion water mass flow, resulting from the combustion of the fuel, from the exhaust gas of the engine;
    introducing the separated water mass flow into the working fluid of the engine at a suitable location;
    at least partially condensating and separating the combustion water mass flow that has been introduced and an additional combustion water mass flow from the exhaust gas;
    at least partially recirculating the combustion water mass flow that has been introduced and the additional combustion water mass flow into the working fluid of the engine;
    wherein the entire water mass flow originates from combustion water and from atmospheric humidity introduced with combustion air.

2. The method of claim 1, further comprising the steps of temporarily introducing a combustion water mass flow from an intermediate storage reservoir into the working fluid of the engine, and filling a combustion water reservoir with excess combustion water during steady-state operation of the engine.

3. The method of claim 1, further comprising the step of at least temporarily feeding at least a part of the combustion water separated from the exhaust gas to one of a combustion water reservoir and an external consumer.

4. The method of claim 3, further comprising the step of at least temporarily and at least partially covering the water mass flow to be introduced with combustion water in intermediate storage in the combustion water reservoir.

5. The method of claim 1, wherein the engine is a supercharged displacement engine, and further comprising the steps of introducing at least a part of the water mass flow into the working fluid downstream of a combustion air compressor, and cooling charge air by introducing the water mass flow.

6. The method of claim 1, further comprising the steps of introducing at least a part of the water mass flow into the working fluid in the combustion chamber of the engine, and reducing nitrogen oxides by introducing the water.

7. The method of claim 1, further comprising the step of introducing at least a part of the water mass flow into the working fluid for intake-air cooling of an air-aspirating engine.

8. The method of claim 1, further comprising the step of introducing at least a part of the water mass flow into a pressurized working fluid of a gas turbo group.

9. The method of claim 1, further comprising the step of heating the water mass flow to be introduced before introducing it into the working fluid.

10. The method of claim 1, further comprising the step of pressurizing and evaporating the water mass flow before introducing it into a pressurized working fluid.

11. The method of claim 10, further comprising the step of superheating formed steam before introducing it into the pressurized working fluid.

12. The method of claim 1, further comprising the steps of defining a setpoint for the water mass flow to be introduced into the working fluid, and controlling actual water mass flow to said setpoint.

13. The method of claim 12, wherein the setpoint depends on a power output parameter of the engine.

14. The method of claim 12, wherein the setpoint is defined as a ratio of a fuel flow.

15. The method of claim 12, further comprising the steps of introducing a water mass flow lower than the setpoint during start-up or in other non-steady operating states, and gradually increasing the introduced water mass flow to the setpoint as partial pressure of the water vapor in the exhaust gas of the engine increases.

16. The method as claimed of claim 12, further comprising the step of using combustion water in intermediate storage in a reservoir for temporarily increasing water mass flow to a value in excess of water mass flow condensing out of the exhaust gas during startup or in other non-steady operating states of the engine to reach the setpoint.

17. The method of claim 1, wherein the introduced water flow is controlled as a function of a measured temperature or humidity value.

* * * * *